United States Patent [19]
Mizuno

[11] Patent Number: 5,413,840
[45] Date of Patent: May 9, 1995

[54] DECORATIVE LAMINATED SHEET HAVING A FEELING OF COATING AND A PROCESS FOR PRODUCING SAME

[75] Inventor: Yasuyuki Mizuno, Tokyo, Japan

[73] Assignee: Riken Vinyl Industry Co., Ltd., Tokyo, Japan

[21] Appl. No.: 110,945

[22] Filed: Aug. 24, 1993

[30] Foreign Application Priority Data

Aug. 27, 1992 [JP] Japan .................. 4-228764

[51] Int. Cl.⁶ .............................................. B32B 3/00
[52] U.S. Cl. .................... 428/195; 428/207; 428/411.1; 428/423.7; 428/480; 421/483; 421/500
[58] Field of Search ............... 428/161, 195, 151, 204, 428/904, 910, 207, 411.1, 423.7, 480, 483, 500; 29/527.2; 264/134

[56] References Cited

U.S. PATENT DOCUMENTS

| | | | |
|---|---|---|---|
| 3,654,062 | 4/1972 | Loew . | |
| 4,136,224 | 1/1979 | Minami et al. | 428/161 |
| 4,296,155 | 10/1981 | Madonia et al. . | |
| 4,622,191 | 11/1986 | Takeuchi | 264/134 |
| 4,918,800 | 4/1990 | Reafler | 29/527.2 |

FOREIGN PATENT DOCUMENTS

| | | |
|---|---|---|
| 0385887 | 9/1990 | European Pat. Off. . |
| 2730899 | 2/1979 | Germany . |
| 1433192 | 4/1976 | United Kingdom . |

OTHER PUBLICATIONS

Database WPI, Derwent Publications Ltd., AN 89-127691, JP-A-1 075 229, Mar. 20, 1989.

Primary Examiner—Patrick J. Ryan
Assistant Examiner—William Krynski
Attorney, Agent, or Firm—Oblon, Spivak, McClelland, Maier, & Neustadt

[57] ABSTRACT

This invention relates to a decorative laminated sheet having a sense of being coated and having improved surface hardness, which is produced by laminating a polyester film excellent in transparency on the surface of a semi-rigid thermoplastic resin film supplied with a colored layer or a pattern-printed layer, and then coating a hard coat layer comprising a UV-curable coating on the surface of the polyester film of the resulting laminated film, and a process for producing same. This invention can provide a sheet not only excellent in scratch resistance, specular reflectivity and sharpness of the surface, but having a sense of being deeply coated as well.

8 Claims, 1 Drawing Sheet

DECORATIVE LAMINATED SHEET HAVING A FEELING OF COATING AND A PROCESS FOR PRODUCING SAME

BACKGROUND OF THE INVENTION

1. Field of the Invention

The present invention relates to a decorative laminated sheet having a colored layer or a pattern-printed layer, having transparency, a quality feel and a sense of being coated, and a process for producing same. In particular, the present invention relates to a decorative laminated sheet having a sense of being coated, which is produced by laminating a polyester film having an excellent transparency on the surface of a semi-rigid thermoplastic resin film on which a colored layer or a pattern-printed layer is applied, and then coating the surface of the resulting laminated film with a hard coat layer comprising an ultraviolet-curable coating to improve the surface hardness, as well as to a process for producing same.

2. Description of the Prior Art

There have been known methods for producing decorative plywood for cabinets, such as a method in which a thermoplastic resin having a colored layer or a pattern-printed layer, e.g., a polyvinyl chloride (PVC) sheet, is laminated on the surface of a woody base material, e.g., a middle-density fiber board (MDF); and a method in which a composite sheet, which is prepared by dry-laminating a polyester (PET) film having excellent transparency on the surface of a thermoplastic resin having a colored layer or a pattern-printed layer such as a PVC sheet, is laminated on the surface of a woody base material such as an MDF.

In such cases, however, the lamination of only a PVC sheet exhibits poor hardness. On the other hand, although PET film per se has sufficient hardness, it tends to be easily scratched by abrasion. Therefore, such laminating treatments are practically disadvantageous.

In addition, there have also been known other methods for producing decorative plywood, in which a sheet that has improved surface hardness from coating an ultraviolet (UV)-curable coating on the surface of a thermoplastic resin having a colored layer or a pattern-printed layer, e.g., a PVC sheet, is laminated on the surface of a metallic or woody base material (Japanese patent Application Nos. 75229/1989 and 176141/1991).

In such methods, however, the UV-curable coating is too rigid. Therefore, the phenomenon that, when the plywood produced by laminating the coating film and the PVC sheet successively on a woody base plate such as an MDF, is subjected to so-called V-cut processing and then bent, the surface coating film of the plywood can not stretch and cracks, and furthermore, the PVC sheet is destroyed.

As mentioned above, the conventional surface-covering sheets are insufficient in scratch resistance, sharpness and specular reflectivity, and are poor in having a so-called sense of being coated as decorative laminated sheets owing to transparency and in having a feeling of depth. Therefore, improved surface covering sheets have been desired for such decorative laminated sheets.

On the other hand, there has been cabinet decorative plywood obtained by laminating a thermoplastic resin having a colored layer or a pattern-printed layer, e.g., PVC sheet, on the surface of a woody base material, e.g., an MDF, followed by post-coating the surface of the PVC sheet to give transparency and a feeling of depth and to endow it with scratch resistance.

However, such decorative plywood has various defects such as a complicated post-coating process, cost and environmental pollution caused by use of organic solvents.

The object of the present invention is to solve the above-mentioned problems in conventional decorative laminated sheets, and to provide a sheet for cabinet decorative plywood which has transparency and a feeling of depth and which also has excellent scratch resistance, and further to provide a decorative laminated sheet having a feeling of coating and improved V-cut processability.

SUMMARY OF THE INVENTION

The present inventors have carried out extensive studies concerning dry-lamination of a polyester film on the surface of a thermoplastic resin having a colored layer or a pattern-printed layer, such as a PVC sheet, and further formation of a hard coat layer using a UV-curable coating, resulting in the completion of the present invention.

That is, the first aspect of the present invention is to provide a decorative laminated sheet having a sense of being coated, which is obtained by successively laminating a thermoplastic resin film having a colored layer or a pattern-printed layer, a polyester film and a hard coat layer.

The second aspect of the present invention is to provide a process for producing a decorative laminated sheet having a sense of being coated, which comprises laminating a polyester film on the surface of a thermoplastic resin film having a colored layer or a pattern-printed layer, and then forming a hard coat layer on the surface of the polyester film of the resulting laminated film.

The third aspect of the present invention is to provide a process for producing a decorative laminated sheet having a sense of being coated, which comprises forming a hard coat layer on the surface of a polyester film, and then laminating a thermoplastic resin film having a colored layer or a pattern-printed layer on the reverse of the polyester film.

DETAILED DESCRIPTION OF THE INVENTION

The present invention will be illustrated in detail as follows.

Figure 1:
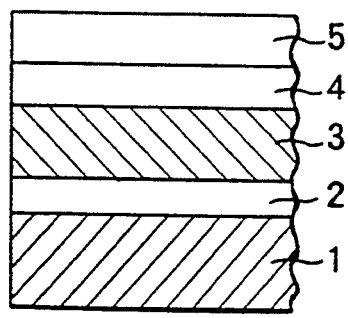
FIG. 1 illustrates a sectional view of the decorative laminated sheet of the present invention.

The construction of the sheet obtained by the present invention is shown in FIG. 1. In FIG. 1, numeral 1 is a thermoplastic resin film, 2 an adhesive layer, 3 a polyester film, 4 a hard coat layer, and 5 a protective film layer.

One characteristic of the decorative laminated sheet of the present invention is that, after lamination of the decorative laminated sheet on, for example, an MDF, no cracking occurs on the surface hard coat layer of the MDF during V-cut processing.

This is because the elongation rate of the polyester film set under the hard coat layer buffers the difference of the elongation rates between the surface hard coat layer and the thermoplastic resin film, and therefore, if the resulting laminate is bent deeply during the V-cut processing step, no cracking occurs.

In any decorative laminated sheet obtained by conventional methods, cracking occurs on the surface hard coat layer due to V-cut processing, since the elongation rate of each layer is not taken into account as in the present invention.

In the specification of the present invention, elongation rate means a value obtained by measurement based on ASTM D882-61.

As the thermoplastic resin film (1) to be used in the present invention, there can be employed PVC sheet and polyolefin sheet.

The PVC sheet may be a polymer or a copolymer of vinyl chloride or a blend thereof. In the PVC sheet of the present invention, any conventional plasticizer and stabilizer can be used. The polymerization degree of the PVC is preferably 500 to 1400, more preferably 600 to 800.

The plasticizer is not particularly limited, so long as it can be used for PVC. However, a phthalic acid ester-based, polyester-based, epoxy-based, trimellitic acid-based or adipic acid ester-based plasticizer is preferably used. Among them, in view of preventing the migration of plasticizer to an adhesive layer, a phthalic acid ester-based plasticizer such as di-(2-ethylhexyl)phthalate is most preferable. The amount of the plasticizer to be used is preferably 0 to 50 parts by weight, more preferably 0 to 30 parts by weight, based on 100 parts by weight of PVC.

In the PVC sheet of the present invention, UV-absorbers, antioxidants and pigments may be added, if necessary.

As a suitable filler to be used, for example, calcium carbonate and clay silica can be employed. Particularly, in view of processability, calcium carbonate is most preferable. The amount of the filler to be used is 0 to 20 parts by weight, preferably 5 to 15 parts by weight, based on 100 parts by weight of PVC.

As the polyolefin sheet, a homopolymer, a random copolymer and a block copolymer can be used singly or in blends of two or more. In view of flexibility, a blend of a homopolymer and a random copolymer is preferable. The melt index (according to ASTM D1238-57) of the polyolefin is preferably 0.1 to 100, more preferably 1.0 to 10.

The surface of the above-mentioned film may be printed with wood grain, pebble or abstract patterns. In the present invention, an opaque PVC film may be further laminated on the surface of the printed layer of the film by the so-called doubling embossing method, in order to enhance the feeling of depth of the resulting sheet. The thickness of the sheet should be as uniform as possible, and must have lay-flat, i.e., a smooth surface, and good appearance with extremely little traces of foreign matter or dents.

The thickness of the thermoplastic resin film (1) is preferably 50 to 500 μm in order to maintain both processability during lamination on the surface of a metallic or woody base material and surface smoothness. If the thickness is less than 50 μm, orange peeling occurs, whereas, if the thickness is over 500 μm, the processability in, for example, V-cut processing is lowered. Therefore, neither condition is preferable.

The elongation rate of the thermoplastic resin film (1) is preferably 100 to 300%, more preferably 150 to 250%.

As the adhesive layer (2), anything can be employed as long as it can adhere the thermoplastic resin film (1) to the polyester film (3). Conventional one-pack adhesives or two-pack-curable adhesives can be used. For example, urethane-based two-pack-curable adhesives can be used.

The thermoplastic resin film can be laminated with the polyester film by conventional dry-lamination methods.

The polyester film layer (3) may be a conventionally used grade, but it should have excellent surface smoothness, since the appearance finished is most important in the present invention.

Polyesters which are preferable in view of the relationship with the elongation rate of the hard coat layer are, for example, polyethylene terephthalate (PET) or polybutylene terephthalate (PBT), each having a structure forming a chain of ester bonds by condensation of the terephthalic acid unit and ethylene glycol unit represented by the general formula:

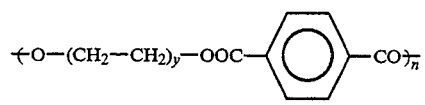

The preferable polyester is one stretched into the machine direction and the transverse direction of the film.

In order to impart good adhesiveness with the PVC film or the like, the polyester film is preferably treated so that hydrophilic groups such as carboxyl groups or hydroxyl groups exist on its surface. In particular, a polyester film containing many carboxyl groups is preferable. For example, a polyester film which surface is treated with a polyester-based ready adhesive or a polyurethane-based ready to use adhesive, is preferable. Particularly, in view of physical properties, the polyester film which surface is treated with a polyurethane-based ready to use adhesive is more preferable.

The thickness of the polyester film layer (3) to be used is 6 to 250 μm, preferably 25 to 100 μm.

The transparency level of the polyester film to be used is preferably a Haze value of about 1.8 or less at the sample film thickness of 25 μm.

The elongation rate of the polyester film layer (3) is preferably 50 to 150%, more preferable 90 to 120%.

The hard coat layer (4) is one excellent in scratch resistance, specular reflectivity and sharpness. As such a hard coat layer (4), there can be employed a coating film obtained by coating a one-pack type or a two-pack-curable type coating, preferably a UV-curable coating, and then curing by UV radiation.

The UV-curable coating to be used is, for example, one which is obtained by blending 82 to 88 parts of a monomer having polyfunctional groups, 12 to 18 parts of a monomer having monofunctional groups, 5 to 10 parts of a photopolymerization initiator, 0.1 part of a silicone-based additive and 100 to 200 parts of a solvent.

Examples of said monomers having polyfunctional groups include polyester acrylate, epoxy acrylate and polyurethane acrylate. Among them, monomers having an acryloyl group or epoxy group are especially preferable.

Examples of said monomers having monofunctional groups include acrylate, (metha) acrylate, vinyl-based acrylate, and so on. Among them, monomers having an acryloyl group are especially preferable.

The hard coat layer (4) preferably contains a polyurethane oligomer, in order to possess flexibility. The hardness of the coating film is preferably at least a 3 H pencil hardness.

The hard coat layer (4) should be coated smoothly by the gravure method and cured to an approximately mirror finish. The hard coat layer (4) must have a thickness of at least 3 μm.

The elongation rate of the hard coat layer (4) is preferably 10% or less, and more preferably 5% or less.

The protective layer (5) may be laminated, if required, in order to protect the surface of the resulting sheet from the careless scratching and staining during storage, transportation and other handling. As such protective layer, there can be employed, for example, a film obtained by supplying a polyolefin-based base film with an acryl-based pressure-sensitive adhesive. The protective layer is releasably laminated on the hard coat.

The method for laminating the thermoplastic resin film (1), the polyester film (3) and the hard coat layer (4) is not particularly limited, but the following two methods are preferable:

(i) a method in which the polyester film (3) is laminated on the surface of the thermoplastic resin film having a colored layer or a pattern-printed layer (1) through the adhesive layer (2), and then the hard coat layer (4) is formed on the surface of the polyester film side of the resulting laminated film using a gravure coater and the like; or (ii) a method in which the hard coat layer (4) is formed on the surface of the polyester film (3), and then the thermoplastic resin film having a colored layer or a pattern-printed layer (1) is laminated on the polyester film side of the resulting film.

The decorative laminated sheet thus obtained is a sheet having a coating film of high surface hardness, with excellent scratch resistance, specular reflectivity and sharpness of the surface, and further having a sense of being coated.

The sheet can be used as an outside material having a feeling of deepness for stereos, tables, storage cabinets, etc. by pasting it to a woody base material such as a middle-density fiber board (MDF).

The sheet of the present invention is not cracked by the so-called V-cut processing carried out after pasting it on the woody base material, where the woody parts are notched and bent to a right angle, to form the corner parts, since the sheet has excellent impact resistance and tensile strength.

As mentioned above, the present invention can provide a decorative laminated sheet which has excellent scratch resistance, specular reflectivity and sharpness of its surface and a sense of being coated and which can provide a V-cut processable decorative plate by lamination on, for example, an MDF, coupled with flexibility and appearance of the thermoplastic resin film, impact resistance of the polyester film and hardness of the hard coat layer.

EXAMPLES

The present invention will be illustrated in more detail by the following examples, but the invention is not limited thereto. All parts and percentages (%) are by weight, unless otherwise stated.

Test Methods

The evaluation tests in the present invention were carried out using the following methods:

(1) Peeling test:

The dry-lamination strength between a polyester film and a thermoplastic resin film (a PVC film) was determined according to JIS K-6854.

That is, the test film was cut in 1-inch widths to make test pieces, which were reinforced by pasting them on an aluminum metal plate on the PVC side using a double coated tape. The PET film was peeled in a 180° direction to measure the strength. The tensile speed was 100 mm/min., and the measuring temperature was 23°±2° C.

(2) Taber-type abrasion test:

This test was carried out according to JIS K-6902.

That is, the susceptability of the surface of the test film to scratching was evaluated by comparison of the condition of the surface of each test film after 100 times of rotational abrasing using a CS-10 abrasion wheel at 500 g×2 (total 1 kg) of load.

(3) Cigarette heat resistance test:

The film was laminated on a woody MDF base material using an urethane-based two-pack adhesive to prepare a test sample. A lighted cigarette was laid on the surface of the test sample film, and the heat resistance of the film was evaluated by observing the condition of the surface of the film after standing for 30 sec.

(4) Sharpness degree:

The sharpness degree of the film was determined using a sharpness meter (PGD IV type; produced by Nippon Shikisai Kenkyusho).

(5) Gloss value:

The gloss value of the film was evaluated using a gloss meter (GMX-202; produced by Murakami Shikisai Kenkyusyo).

That is, the surface of the test film was irradiated with the light from a 60° incident angle light source, and the quantity of reflected light was expressed numerically.

(6) Stain resistance:

The surface of the test film was stained with the staining substances shown below, and washed with water 6 hours after standing, and then wiped with ethanol, to evaluate the stain resistance of the film. The evaluation was carried out visually and ranked into 4 grades.

Staining substances: red marking ink (oily), black marking ink (oily), red ink (aqueous), blue ink (aqueous), crayon, shoe black, lipstick, ketchup, mustard sauce, vinegar, salad oil, 1% aqueous ammonia, coffee, black tea, milk, grapefruit juice, water, soapy water, aqueous synthetic detergent (Mama Lemon: a trade name), gasoline, ethanol, IPA (isopropyl alcohol), acetone, and 1% aqueous sodium phosphate.

(7) Surface hardness test:

The test was carried out according to JIS K-5400.

That is, the surface of the test film was scratched by using standard pencils with 200 g of load at an angle of 45 using a pencil hardness test apparatus. The hardness of the hardest pencil among the pencils which did not scratch the film surface reflects the surface hardness. For example, a surface hardness of 3 H means that the film surface is scratched by a 4 H pencil, but not by a 3 H pencil.

(8) Impact resistance:

The impact resistance of the test film was determined by a low temperature impact method according to ASTM D-1790.

EXAMPLE 1

Calender:

To 100 parts of a PVC resin, 8 parts of a plasticizer (DOP) and 1.2 parts of a black carbon pigment were blended, and the resulting mixture was subjected to calendering to prepare a PVC film (1) which had a thickness of 0.17 mm, high precision, a uniformity in the film surface appearance and good lay-flat (produced by Riken Vinyl Industry Co., Ltd.).

Polyester film (3):

An opaque film 50 μm thick, the surface and reverse being treated with a ready to set adhesive, and which had a Haze value of 1.2 or less (produced by Unitica Ltd.), was used.

Dry-lamination:

An urethane-based two-pack-curable adhesive (produced by Toyo Ink Mfg. Co., Ltd.) was coated on the surface of the PVC film (1) in a 4 to 5 μm thickness (dry base) using a gravure coater, and the resultant was dried at about 70° C. for 1 min. in a drying kiln. The resulting PVC film (1) was laminated with the polyester film (3) using a laminator using a roll temperature of about 120° C.

Hard coat layer:

A UV-curable coating (Clear: produced by Riken Vinyl Industry Co., Ltd.) was gravure-coated on the laminated polyester film layer (3) in a 4 to 5 μm thickness (dry base). After drying, the resulting film was cured using a high pressure mercury lamp (80 to 160 W).

Protective film:

In order to prevent scratching and staining during storage, transportation and the like, a protective film was laminated on the polyester side of the decorative laminated sheet obtained by the above procedures. The protective film was one which comprised a polyethylene about 60 μm thick, in which an acryl-based adhesive was coated on one side (produced by Hitachi Chemical Co., Ltd.)

The physical properties of the decorative laminated sheet, which were evaluated with the protective film removed, are shown in Table 1 below.

TABLE 1

| Evaluation Item | Results | Remarks |
| --- | --- | --- |
| Lamination strength (between PET and PVC) | 1.8 kg/ins. | 180° peeling |
| Surface hardness (pencil hardness) | 3 H | JIS K-5400 |
| Scratch resistance (abrasion resistance using the abrasion wheel) | No scratch | Taber type |
| Heat resistance (Cigarette heat resistance) | No alteration | 30 sec. contact |
| Specular reflectivity (gloss value) | 100 or higher | 60° gloss |
| Sharpness (sharpness degree) | 1.0 | |
| Stain resistance | No alteration | |

EXAMPLE 2

Calender:

To 100 parts of a PVC resin, 8 parts of a plasticizer (DOP), 4 parts of a brown pigment and 0.5 part of a yellow pigment are blended, to prepare a film 0.1 mm thick having good lay-flat (produced by Riken Vinyl Industry Co., Ltd.). On the resulting film, fine maple patterns were printed. Then, a clear film 0.08 mm thick which contained only 100 parts of the same PVC resin and 8 parts of the same plasticizer was further double-embossed on the printed side of the film, to prepare the PVC film (1).

By using the PVC film (1) thus obtained, lamination of the polyester (3), coating of the UV-curable coating agent (4), curing by UV radiation and further lamination of the protective film (5) were carried out in the same manner as Example 1, to give a decorative laminated sheet.

The physical properties of the resulting decorative laminated sheet, which were evaluated with the protective film removed, were approximately similar to the results shown in Table 1 above.

EXAMPLE 3

Calender:

For the PVC film (1), the one from Example 1 was used.

As the polyester film (3), the one from Example 1 was used, and a hard coat layer as used in Example 1 was coated on the polyester film (3) and then cured.

Dry-lamination:

Next, on the surface of the PVC film (1), a polyester film coated with a hard coat layer was laminated and then further laminated with a protective film in the same manner as Example 1, to give a decorative laminated sheet.

The physical properties of the resulting decorative laminated sheet, which were evaluated with the protective film removed, were approximately similar to the results shown in Table 1 above.

EXAMPLE 4

Each of the decorative laminated sheets produced in Examples 1 to 3 was laminated on an MDF (middle-density fiber board) in the following manner:

That is, on an MDF having a 5 to 15% moisture content (240 mm × 1200 mm × 18 mm; "Starwood" produced by Hokushin), a two-pack-curable adhesive mainly consisting of ethylene-vinyl acetate copolymer was coated in an amount of about 140 g/mm$^2$ by a roll coating method. Then, each of the decorative laminated sheets of Examples 1 to 3 was laminated on the resulting MDF, followed by pressing and aging at 1 to 5 kg/cm2 for about 12 hours.

The resulting laminated plates were evaluated for their various surface properties with the protective film removed from each laminated plate. The results are shown in Table 2 below. In the evaluations, the results except for specular reflectivity and sharpness were similar to the results of Table 1 above.

TABLE 2

| Evaluation item | Measured Value | Remarks |
| --- | --- | --- |
| Specular reflectivity (gloss value) | 90 | 60° gloss meter |
| Sharpness (sharpness degree) | 0.1 | sharpness meter |

EXAMPLE 5

Figure 2:
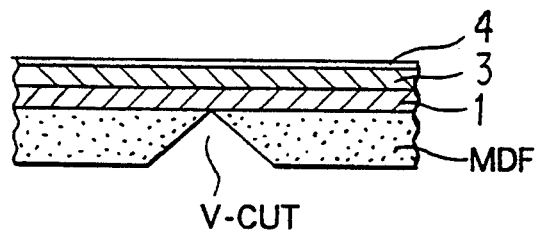
FIG. 2 illustrates a lamination of the decorative laminated sheet of the present invention on an MDF treated by V-cut processing according to Example 5.
Figure 3:
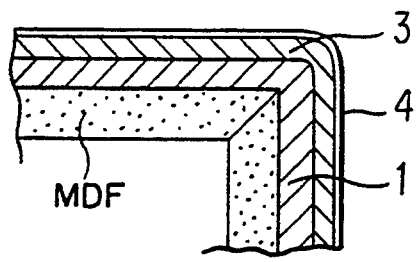
FIG. 3 illustrates an MDF which is subjected to V-cut processing and bent at a right angle in Example 5.

The MDFs with decorative laminated sheets produced in Example 4 were cut into 600 mm × 400 mm pieces. The MDF sides of the pieces were notched at the mid point of the length in the width direction at a 90° open angle V-shape as shown in FIG. 2. The cut pieces were bent under a processing temperature of 23°±2° C. and a bending speed of 1 m/min., to form a right angle as shown in FIG. 3.

When the appearances of the bent parts were checked, no abnormalities were observed in the decorative laminated sheets or the printed patterns.

Comparative Example 1

On the PVC film (1) used in Example 1, the UV-curable coating used in Example 1 was coated directly and then cured. The impact resistance of the resulting film was compared with that of the decorative laminated sheet produced in Example 1. The comparative results are shown in Table 3 below.

As shown in Table 3, the impact resistance of the film produced in Comparative Example 1 was greatly inferior to that of the decorative laminated sheet of Example 1, and the interpositioning effect of the polyester film (3) in the decorative laminated sheet of Example 1 was confirmed.

In this test, the impact resistance of the film consisting of only of PVC was also determined, but the results were also inferior to that of the decorative laminated sheet of the present invention.

TABLE 3

| | | Impact Resistance | | | | | |
|---|---|---|---|---|---|---|---|
| | | Example 1 (UV/PET/PVC) | | Comp. Example 1 (UV/PVC) | | PVC Only | |
| | | Accept. | Reject. | Accept. | Reject. | Accept. | Reject. |
| 23° C. | length | 10 | 0 | 0 | 10 | 10 | 0 |
| | width | 10 | 0 | 0 | 10 | 10 | 0 |
| 5° C. | length | 10 | 0 | 0 | 10 | 10 | 0 |
| | width | 10 | 0 | 0 | 10 | 10 | 0 |
| 0° C. | length | 10 | 0 | 0 | 10 | 10 | 0 |
| | width | 10 | 0 | 0 | 10 | 8 | 2 |
| −10° C. | length | 10 | 0 | 0 | 10 | 10 | 0 |
| | width | 10 | 0 | 0 | 10 | 0 | 10 |

In the table, "Accept." means Accepted, and "Reject." means Rejected.

Comparative Example 2

A laminated film of polyester/PVC was produced in the same manner as Example 1, except for coating a UV-curable coating. The scratch resistance of the surface of the resulting laminated film was tested in comparison with the decorative laminated sheet of Example 1. In the scratch resistance test, a test method using steelwool #0000 was also carried out in addition to said Taber type method.

The results are shown in Table 4 below. As shown in Table 4, the advantages of the construction of the present invention, which has a hard coat layer, was confirmed.

TABLE 4

| | Taber type | Steelwool |
|---|---|---|
| A sheet of Example 1 | No sctratches | No scratches |
| A film of Comp. Example 2 | Scratched | Scratched |

Since the decorative laminated sheet of the present invention is constructed as mentioned above, the present invention can provide a sheet having excellent scratch resistance, specular reflectivity and sharpness of surface, and which has a sense of deep coating. This sheet is useful as the decorative covering sheet for such as the outside box for various kinds of cabinets, furniture, audio equipment, and so on.

What is claimed is:

1. A decorative laminated sheet which is produced by successively laminating a thermoplastic resin film having a colored layer or a pattern-printed layer thereon and having an elongation rate of 100 to 300%, a transparent polyester film having an elongation rate of 50 to 150% and a thickness ranging from 6 to 250 μm, and a hard coat layer having an elongation rate of 10% or less.

2. The laminated sheet of claim 1, wherein said thermoplastic resin film is a sheet of PVC or polyolefin.

3. The laminated sheet of claim 1, wherein the thermoplastic resin film has a thickness ranging from 50 to 500 μm.

4. The laminated sheet of claim 1, wherein the thermoplastic resin film has an elongation rate of 150 to 250%.

5. The laminated sheet of claim 1, wherein said polyester film has a thickness ranging from 25 to 100 μm.

6. The laminated sheet of claim 1, wherein said polyester film has an elongation rate of 90 to 120%.

7. The laminated sheet of claim 1, wherein said hard coat layer has a thickness of at least 3 μm.

8. The laminated sheet of claim 1, wherein said hard coat layer has an elongation rate of 5% or less.

* * * * *